UNITED STATES PATENT OFFICE.

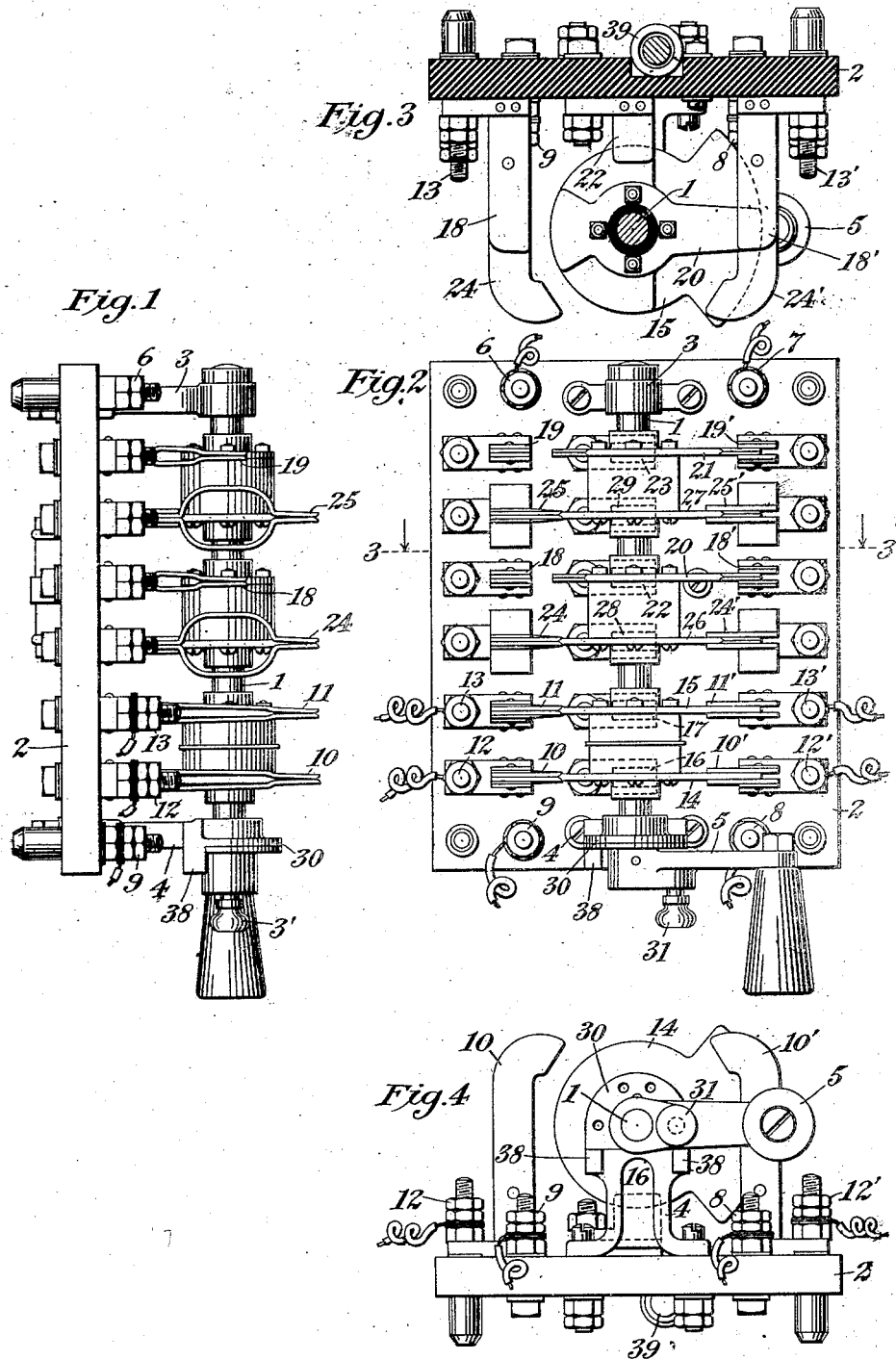

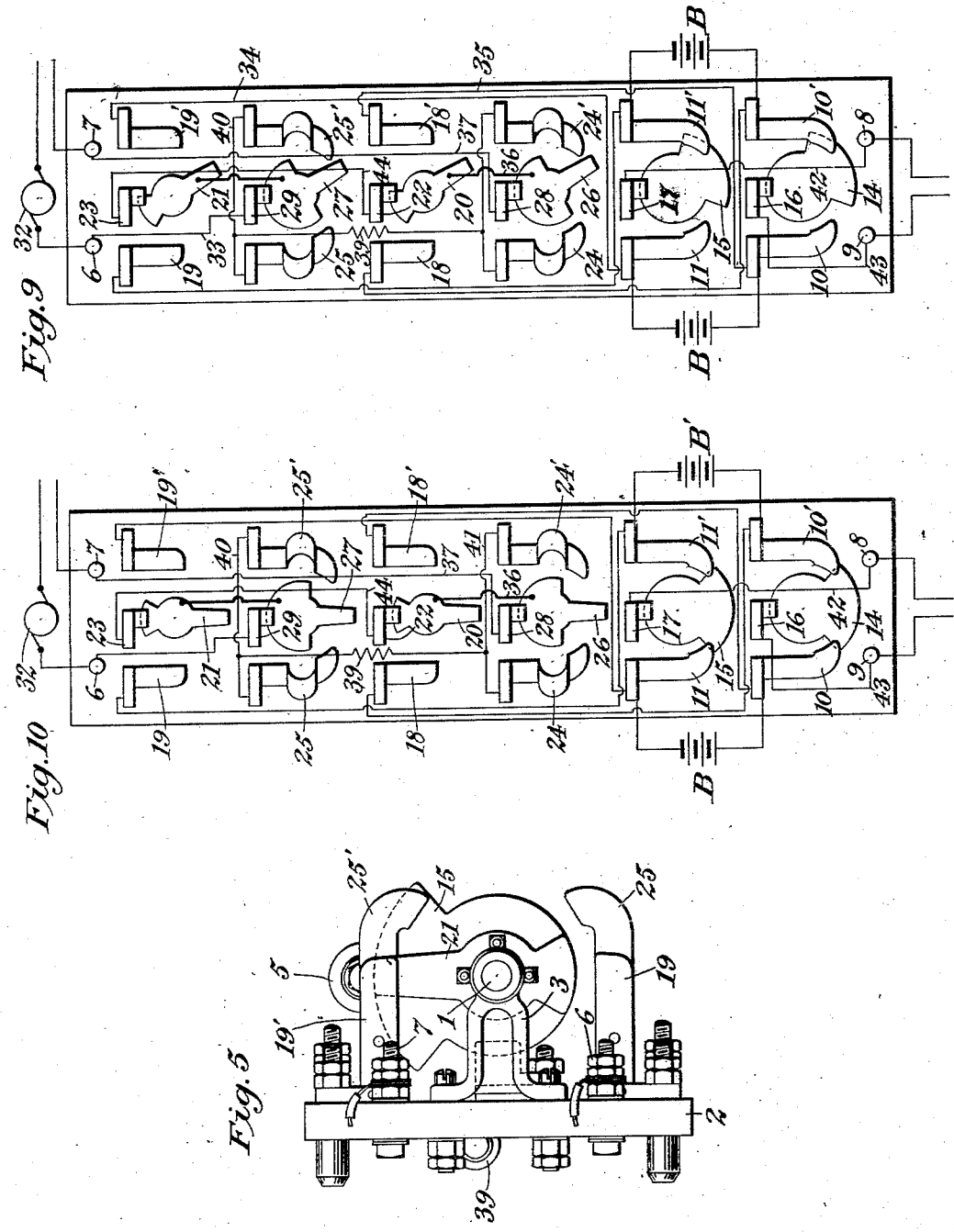

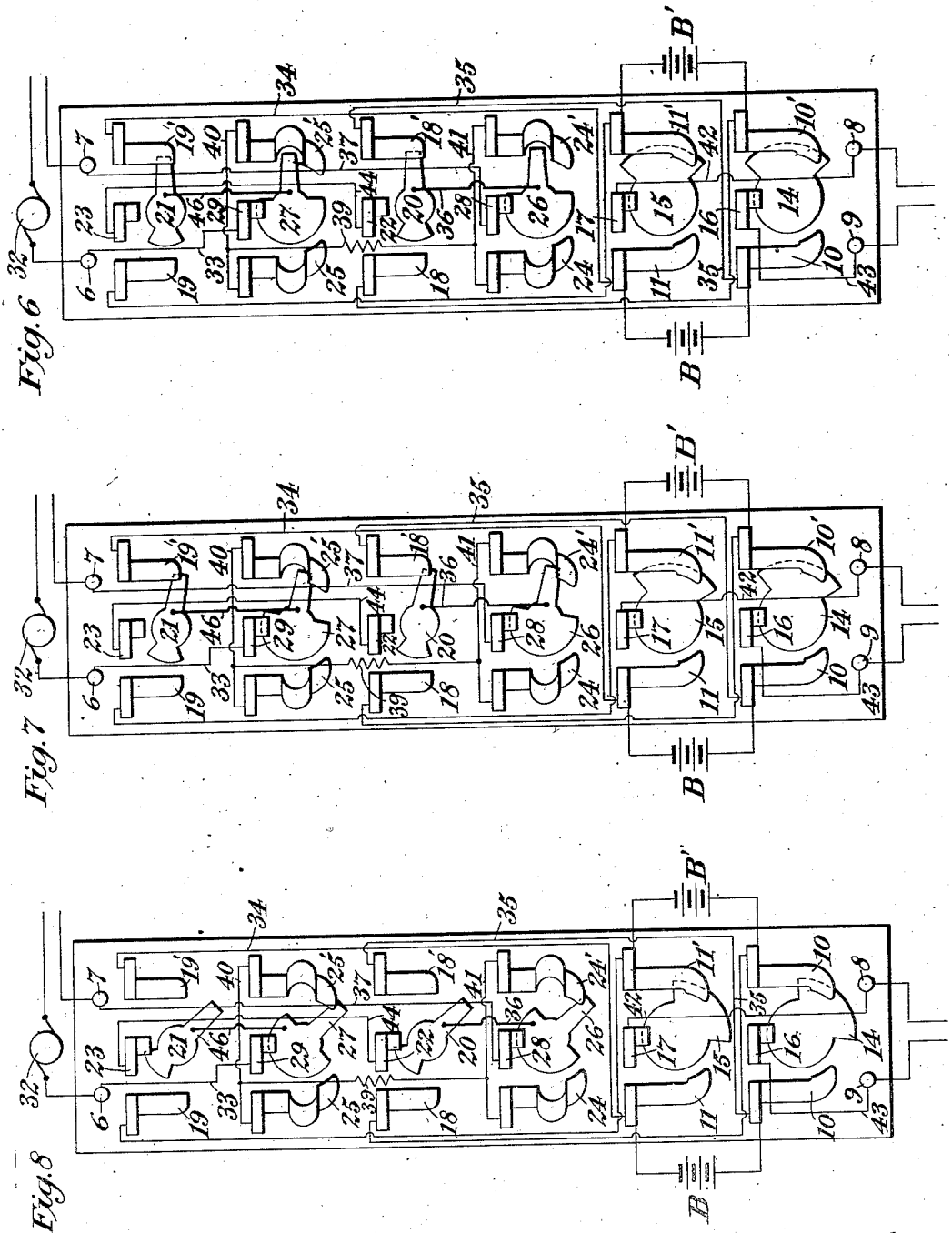

CLARENCE W. COLEMAN, DECEASED, LATE OF WESTFIELD, NEW JERSEY, BY KATHARINE COLEMAN, ADMINISTRATRIX, OF WESTFIELD, NEW JERSEY, ASSIGNOR, BY MESNE ASSIGNMENTS, TO HALL SWITCH & SIGNAL COMPANY, OF NEW YORK, N. Y., A CORPORATION OF MAINE.

CHARGING-SWITCH FOR STORAGE BATTERIES.

1,090,201.  Specification of Letters Patent.  Patented Mar. 17, 1914.

Application filed January 18, 1911. Serial No. 603,380.

*To all whom it may concern:*

Be it known that CLARENCE W. COLEMAN, deceased, late a citizen of the United States, residing at Westfield, in the county of Union and State of New Jersey, did invent certain new and useful Improvements in Charging-Switches for Storage Batteries, of which the following is a specification, reference being had therein to the accompanying drawings, forming part thereof.

This invention relates broadly to electric circuit-controlling devices, such as electric switches, and particularly to switches for use in charging storage batteries.

The improved charging switch embodying this invention is designed for use particularly in connection with storage batteries in railway signaling service. To prevent interruption of the circuit, such batteries are arranged in duplicate, that is, two for each circuit, so that at least one may always be in circuit.

One object of this invention is to provide a simple, compact and reliable switch, which by a simple operation will connect either battery into or will cut it out of the charging circuit, and similarly will connect either battery into or will cut it out of the operating or discharge circuit, always keeping at least one of the two batteries connected in the discharge circuit.

Another object of this invention is to provide a switch of such a design that the operating handle is entirely separate from the contact making parts, so as to reduce to a minimum any liability of injury to the operator through touching the contact-making parts while operating the switch; and also to make it possible to incase the contact-making parts, if desired, without inclosing the handle.

Other objects and advantages of this invention will appear from the following description.

The embodiment of this invention shown in the accompanying drawings will now be described, and will thereafter be pointed out in claims.

Figure 1 is a side elevation of the improved switch. Fig. 2 is a front elevation of the same. Fig. 3 is a horizontal section of the same, taken on line 3—3 of Fig. 2, looking down. Fig. 4 is a bottom view of the same. Fig. 5 is a plan view of the same. Figs. 6 to 10, inclusive, are diagrammatic views showing the circuit connections and five different positions of the switch.

In the illustrated embodiment of the invention, knife switches are employed to control the charging and discharging circuits, there being in all eighteen pairs of stationary contact jaws constituting electric terminals, arranged in sets each composed of three pairs of stationary jaws, and six contact blades or contact-controlling members, mounted at intervals on an operating shaft, each blade being arranged to coöperate with the jaws of one set consisting of three pairs of contact jaws. The sets of contact jaws include battery sets, that is, sets to which the poles of the batteries are connected, and charging sets connected to the charging circuit and arranged under the control of their contact blades to connect the charging circuit to the batteries at the proper times. The operating shaft 1 is vertically arranged in front of the back board or support 2, and extends substantially parallel to the vertical middle line of the support, being journaled in an upper bearing 3 and a lower bearing 4, secured to the support; and an operating handle 5 is secured on the lower end of the operating shaft. The support may be attached to the wall in any suitable way, as by screws, four posts being provided, one at each corner, as shown, to properly space the support from the wall. The charging circuit wires are attached to binding posts 6 and 7 at the upper end of the support, and the operating or discharging circuit wires are attached to binding posts 8 and 9 at the lower end of the support. The eighteen pairs of contact jaws are arranged in three vertical rows of six pairs each on the front of the support, one row on each side of the shaft, and one row of short contact jaws, which are termed the middle contact jaws, between the other two rows and directly back of the shaft. The pairs of contact jaws project forwardly from flat securing plates, as shown, each plate provided with a bolt perforation and secured to the support by bolts. Back of the support are wires electrically connecting these bolts and the post screws of the binding posts 6, 7, 8 and 9, and forming electric circuit connections which will be described later. The eighteen pairs of contact jaws arranged in three rows as above stated, provide six sets of three pairs of contact jaws each, and the three pairs of contact jaws of each set, two pairs being outer jaws and one pair being middle jaws, are arranged in a horizontal plane in the path of one of the six contact blades on the shaft, so that each blade may coöperate in different positions with the contact jaws of its set to open and close the contacts as the shaft is rotated or oscillated by the handle 5.

The batteries B and B' are connected on opposite sides to the two outer pairs of contact jaws 10 and 11, and 10' and 11', respectively, of the two lower sets or sets nearest the operating handle, which are the battery sets of contact jaws. These jaws are termed the battery contact jaws, and the bolts 12 and 13, and 12' and 13', respectively, which secure these contact jaws to the base, serve as binding posts for this purpose. The two contact blades 14 and 15 nearest the handle, which are termed the battery contact blades, are insulated from each other, and each blade is made up of two portions of different radius, the portions of smaller radius of these jaws extending always between the middle contact jaws 16 and 17, respectively, which are in the same set with the battery contact jaws 10 and 10', and 11 and 11', respectively, and the arms or portions of larger radius including arcs of sufficient length to bridge the distance between the battery contact jaws 10 and 11, and 10' and 11', respectively, so that at least one of the duplicate batteries will always be in the discharging circuit, as will hereafter be explained. Counting from the lower end, the fourth and sixth pairs of side contact jaws 18 and 18', and 19 and 19', are shorter than the third and fifth side contact jaws and are what are termed the charging contact jaws, the purpose of which will appear hereinafter. The blades 20 and 21, which coöperate respectively with these charging contact jaws, have comparatively narrow radial arms which enter between these jaws and make contact just at the ends of the oscillatory movement of the operating shaft. The blades 20 and 21 also have shorter sectoral arms of a short arc, as shown, so that they engage with their middle coöperating contact jaws 22 and 23 during only a short angular movement, as will hereinafter appear. The third and fifth side contact jaws 24 and 24', and 25 and 25', which are termed the resistance contact jaws, are of the same length as the battery contact jaws, but are looped or bowed at middle portions, as shown. Their contact blades 26 and 27, respectively, also have narrow radial arms which contact with the side contact jaws, and sector shaped parts, which contact with the middle contact jaws, 28 and 29, respectively, but the sectors are of a long arc, as shown, so that they always engage between their middle contact jaws. The contact blades are all insulated from the shaft 1 by insulating collars, as shown in Fig. 3. The third and fourth contact blades 26 and 20 are electrically connected, as by rivets, and the fifth and sixth contact blades 27 and 21 are also similarly connected. The parts are so designed that, as the handle is moved forward and to the left from the positions shown in Figs. 1 to 5, inclusive, and in the diagram Fig. 6, the radial arms of the third and fifth blades 26 and 27, leave the looped portions of their side contact jaws 24' and 25', which are the resistance contact jaws, and close contact with these resistance contacts just before the radial arms of the fourth and sixth blades 20 and 21 disconnect from their charging jaws 18' and 19' (see Fig. 7). The sector shaped parts of the fourth and sixth blades 20 and 21 enter between their middle contact jaws 22 and 23 just before the radial arms of the third and fifth contact blades leave their contact jaws (see Fig. 8). The opposite occurs, of course, in the reverse movement; and the corresponding order holds true when the contact blades are in the other half of their movement in connection with the contact jaws on the left side of the shaft.

There are four locked positions of the shaft and contact blades, as will be hereafter pointed out. To lock the shaft in these positions, the top of the bearing 4 is provided with a semi-circular keeper plate 30, which has in it four properly spaced keeper holes or sockets, as appears in Fig. 4; and a spring-held pin 31 in a hole in the crank-arm of the handle 5 serves as a latch and registers in turn with each of these four holes as the crank is oscillated, and locks the crank as the pin 31 engages in any one of these four holes in the keeper plate. Lugs 38 are provided, one on each side at the bottom edge of the keeper plate 30, which lugs serve as stops to the oscillation of the handle 5 and shaft 1.

The operation of the device will now be described.

Fig. 6 shows the parts in the first locked position, corresponding to that shown in Figs. 1 to 5 inclusive. In this position the battery B' is discharging into the service line while the battery B is being charged. The discharge circuit from battery B' is as follows: from the upper terminal of battery B' to the contact jaws 11', contact blade 15, middle contact jaws 17, wire 42, binding post 8, service line to binding post 9, wire 43, middle contact jaws 16, contact blade 14, contact jaws 10', and to the lower terminal of the battery. The charging circuit may be traced as follows: from the left terminal of the generator 32 to the binding post 6, wire 33, middle contact jaws 29, contact blade 27 and through the electrical connection 46 from the contact blade 27 to the contact blade 21, contact jaws 19', wire 34, contact jaws 11 (not in contact with their blade 15) battery B, contact jaws 10 (not in contact with their blade 14) wire 35, contact jaws 18', contact blade 20, electrical connection 36 from the contact blade 20 to the contact blade 26, middle contact jaws 28, wire 37, and binding post 7 of the charging line to the right terminal of the generator 32. In practice, a plurality of charging switches are connected in multiple in the charging circuit, and, as explained hereinafter, the contacts are so arranged that the charging circuit is always intact at each switch, irrespective of whether or not a battery is included in the circuit at any particular switch. To indicate the inclusion of other switches in the circuit, the charging circuit is shown open between the binding post and the generator 32.

When the battery B is sufficiently charged, if it is desired merely to cut off the battery B from the charging line and to leave the battery B' in the discharging circuit, the operating handle is moved forward and to the left until the latching pin 31 enters the next hole in the keeper plate 30, and locks the parts in the position shown in Fig. 9, which is the next locked position of the parts. During the transition to this position, however, the device passes through intermediate positions, two of which are illustrated in Figs. 7 and 8. To prevent sparking as the battery is cut off, that is, as the charging contacts are broken between the fourth contact blade 20 and its right contact jaws 18' and between the sixth contact blade 21 and its right contact jaws 19', a resistance 39 is connected in multiple in the circuit through the engagement of the third and fifth contact blades 26 and 27 with the resistance contact jaws 24' and 25' respectively. As previously pointed out, this occurs just before the charging contacts are broken at the fourth and sixth right contact jaws 18' and 19', and the parts occupy the position illustrated in Fig. 7, in which the charging circuit is still intact, as described in connection with Fig. 6, and in which the circuit containing the resistance may be traced as follows: from binding post 6, through wire 33, middle contact jaws 29, resistance contact blade 27, resistance contact jaws 25', wire 40, resistance 39, wire 41, resistance contact jaws 24', resistance contact blade 26, middle contact jaws 28, and wire 37 to binding post 7.

The next position, illustrated in Fig. 8, is occupied just after the charging contacts are broken at the fourth and sixth right contact jaws 18' and 19', and before the resistance contacts are broken at the contact jaws 24' and 25'. In this position the resistance circuit is the same as before, while the charging circuit is closed so as to exclude any battery at this switch but to leave it in closed condition in its relation to other switches or instruments, the circuit being thus closed through the switch shown as follows: from binding post 6, through wire 33, middle contact jaws 29, contact blade 27, electrical connection 46, contact blade 21, middle contact jaws 23, wire 44, middle contact jaws 22, contact blade 20, electrical connection 36, contact blade 26, middle contact jaws 28, wire 37, and binding post 7.

In the position illustrated in Fig. 9, which, as previously stated, is the next locked position, the resistance circuit is broken at the contact jaws 24' and 25' and the charging circuit is closed exclusive of the batteries of this switch as described in connection with Fig. 8. In all of these four positions, the connection of battery B', with the discharge circuit remains intact.

If it be desired to again charge battery B, and the handle and attached parts be moved back to the position shown in Fig. 6, the successive positions and operations previously described will, of course, be repeated in the reverse order. If now it be desired to charge battery B' and to connect battery B into the service line, the handle is turned the full distance to the left to the fourth locked position, and the parts assume a position opposite to that illustrated in Fig. 6, in which position, as will readily be seen, the charging circuit is connected through the battery B', and the battery B is connected into the discharge circuit. Similarly, to merely cut the battery B' out of the charging circuit, the handle is moved forward and to the right to the next locked position, opposite to and corresponding to that illustrated in Fig. 9, in which position the battery B is still in the discharging circuit, but the charging circuit is short-circuited through the switch. In the transition to this position the parts pass through the two intermediate positions which correspond to those illustrated in Figs. 7 and 8, and in which the resistance is connected into and then cut out of the circuit, successively.

As previously stated, to prevent the discharge circuit from ever being momentarily interrupted during the shifting of the switch from one battery connection to another, the arcs of the sector-shaped portions on the battery contact blades 14 and 15 are sufficiently long to bridge the distances between the contact jaws 10 and 10', and 11 and 11', respectively. This middle position is illustrated in Fig. 10. The charging circuit is the same as described in connection with Fig. 9, and both of the batteries B and B' are connected into the discharge circuit. With this improved switch, therefore, no battery is ever short-circuited, and there is no sparking whatever, due to the fact that no circuit or battery is directly opened, but is first caused to include a resistance, or, in the case of the batteries, both are included in the circuit before one is cut out, thereby cutting down the current at least one half. The parts are also very compactly arranged, so that a slight movement of the operating handle, which is entirely separated from the contacts, is all that is needed to shift from one position to another.

It is obvious that various modifications may be made in the construction shown and above particularly described within the principle and scope of this invention.

What is claimed is:

1. An electric circuit-controlling device for storage batteries, comprising, in combination with two storage batteries, a charging circuit and a discharging circuit, a plurality of rotative contact-controlling members, a plurality of electric terminals arranged in sets of three disposed in the paths of movement of the contact-controlling members, one set for each contact-controlling member, the poles of one battery being connected respectively to one terminal in each of two sets, the poles of the other battery being connected respectively to another terminal in each of the two said sets and the third terminal of the two said sets being connected to the discharging circuit, the respective contact-controlling members of the two said sets being adapted to connect one battery into the discharging circuit in one rotative position and to connect the other battery into the discharging circuit in another rotative position; the charging circuit being connected to the terminals of the other sets, the terminals of the other sets coöperating with their respective contact-controlling members to properly connect the batteries into the charging circuit.

2. An electric circuit-controlling device for storage batteries, comprising, in combination with two storage batteries, a charging circuit and a discharging circuit, a plurality of rotative contact-controlling members, a plurality of electric terminals arranged in sets of three disposed in the paths of movement of the contact-controlling members, one set for each contact-controlling member, the sets including battery sets and charging sets, the poles of the batteries and the discharging circuit being connected to the terminals of the battery sets, so that in one rotative position of the battery contact-controlling members one battery is connected into the discharging circuit and in another rotative position the other battery is connected into the discharging circuit; terminals of the charging sets being connected to the charging circuit, and the contact-controlling members of said terminals of the charging sets being arranged to coöperate therewith to properly connect the batteries into the charging circuit.

3. An electric circuit-controlling device for storage batteries, comprising, in combination with two storage batteries, a charging circuit and a discharging circuit, a plurality of rotative contact-controlling members, a plurality of electric terminals arranged in sets of three disposed in the paths of movement of the contact-controlling member, the sets including battery sets and charging sets, the poles of the batteries and the discharging circuit being connected to the terminals of the battery sets so that in one rotative position of the battery contact-controlling members one battery is connected into the discharging circuit and in another rotative position the other battery is connected into the discharging circuit; and a resistance, terminals of the charging sets being connected to the charging circuit, other terminals being connected to the resistance, and the respective contact-controlling members coöperating with the said terminals to alternately connect and disconnect the respective batteries into the charging circuit in different rotative positions and to connect the resistance into the charging circuit before either battery is disconnected from the charging circuit.

4. An electric circuit-controlling device for storage batteries, comprising, in combination with two storage batteries, a charging circuit and a discharging circuit, an operating shaft, a plurality of radially extending contact blades carried by the shaft, a plurality of contact jaws arranged in sets of three disposed in the paths of movement of the contact blades, one set for each blade, the poles of one battery being connected respectively to one contact jaw in each of two sets, the poles of the other battery being connected respectively to another contact jaw in each of the two said sets and the third contact jaw of the two said sets being connected to the discharging circuit, the respective contact blades of the two said sets being adapted to connect one battery into the discharging circuit in one rotative position and to connect the other battery into the discharging circuit in another rotative position; the circuit in another rotative position; the charging circuit being connected to the jaws of the other sets, the jaws of the other sets coöperating with their respective contact blades to connect one battery into the charging circuit in one position of the contact blades and to connect the other battery into the charging circuit in another position of the contact blades.

5. An electric circuit-controlling device for storage batteries comprising, in combination with two storage batteries, a charging circuit and a discharging circuit, an operating shaft, a plurality of radially extending contact blades carried by the shaft, a plurality of contact jaws arranged in sets of three disposed in the paths of movement of the contact blades, one set for each blade, the sets including battery sets and charging sets, the poles of the batteries and the discharging circuit being connected to the terminals of the battery sets, so that in one position of the battery contact blades one battery is connected into the discharging circuit and in another position of the battery contact blades the other battery is connected into the discharging circuit, the charging circuit being connected to the jaws of the charging sets, the jaws of the charging sets coöperating with their respective contact blades to connect one battery into the charging circuit in one position of the contact blades, to the connect the other battery into the charging circuit in another position of the blades.

6. An electrc circuit-controlling device for storage batteries comprising, in combination with two storage batteries, a charging circuit and a discharging circuit, an operating shaft, a plurality of radially extending contact blades carried by the shaft, a plurality of contact jaws arranged in sets of three disposed in the paths of movement of the contact blades, one set for each blade, the sets including battery sets and charging sets, the poles of the batteries and the discharging circuit being connected to the jaws of the battery sets so that in one position of the battery blades one battery is connected into the discharging circuit and in another position the other battery is connected into the discharging circuit; and a resistance, certain contact jaws of the charging sets being connected to the charging circuit, other contact jaws being connected to the resistance and the respective contact blades coöperating with the said jaws to alternately connect and disconnect the respective batteries into the charging circuit in different positions of the blades and to connect the resistance into the charging circuit before either battery is disconnected from the charging circuit.

7. An electric circuit-controlling device for storage batteries, comprising, in combination with two storage batteries and a charging circuit, a plurality of rotative contact-controlling members, a plurality of electric terminals arranged in sets disposed in the paths of movement of the contact-controlling members, one set for each contact-controlling member, the poles of the batteries being connected to certain terminals, the charging circuit being connected to other terminals, and a resistance connected to other terminals, the contact-controlling members in control of the battery terminals being arranged in one position to connect into the charging circuit the terminals to which the poles of one battery are connected and in another position to connect into the charging circuit the terminals to which the poles of the other battery are connected, and the contact-controlling members in control of the resistance terminals being arranged to connect the resistance terminals into the charging circuit in two positions and before either battery is disconnected from the charging circuit.

8. An electric circuit controlling device comprising an operating shaft, a plurality of contact-controlling members carried by the shaft including two charging contact-controlling members each having two arms, two resistance contact-controlling members and two battery contact-controlling members, each having a single arm, one charging contact-controlling member being connected to one resistance contact-controlling member and the other charging contact-controlling member being connected to the other resistance contact-controlling member, a plurality of electric terminals arranged in sets disposed about the shaft in the paths of movement of the contact-controlling members; two storage batteries, a discharging circuit, and a charging circuit; two sets of the electric terminals being each composed of two charging terminals disposed in the path of one arm of the respective charging contact-controlling member and an intermediate charging terminal disposed in the path of the other arm of the respective charging contact-controlling member; two sets being each composed of two resistance terminals disposed in the path of the arm of the respective resistance contact-controlling member and an intermediate resistance terminal arranged to make continuous contact with its respective resistance contact-controlling member; and two sets being each composed of one battery terminal connected to the pole of one battery and another battery terminal connected to a pole of the other battery, the two terminals thus connected to the batteries being disposed in the path of the arm of their respective battery contact-controlling member, and an intermediate terminal connected to a terminal of the discharging circuit and arranged to make continuous contact with its contact-controlling member, the battery contact-controlling members being adapted to bridge the distance between the respective battery terminals, so that in one position of the shaft one of the batteries will be connected to the discharging circuit, in another position of the shaft the other battery will be connected to the discharging circuit and in an intermediate position of the shaft both batteries will be connected to the discharging circuit; and a resistance suitably combined with the resistance terminals and contact-controlling members and charging circuit so that in the actuation of the operating shaft the resistance is connected into the charging circuit before the battery is disconnected from the charging circuit; the charging circuit being combined with the charging terminals and contact-controlling members and the battery terminals so as to properly connect the batteries with the charging circuit.

9. An electric circuit-controlling device for storage batteries, comprising, in combination with two storage batteries, a charging circuit and a discharging circuit, an operating shaft, a plurality of six contact blades carried by the shaft and disposed along the length thereof, each blade extending radially therefrom on two sides of the shaft, a plurality of contact jaws arranged in sets of three disposed in the paths of movement of the contact blades, one set for each blade, the sets including two battery sets and four charging sets, the poles of one battery being connected to the side jaws of the battery sets on one side and the other battery being connected to the side jaws of the battery set on the other side and the discharging circuit being connected to the intermediate contact jaws of the two battery sets, the contact blades of the two battery sets being shaped to connect one battery with the discharging circuit in one position of the shaft and to connect the other battery with the discharging circuit in another position of the shaft, the charging circuit being connected to the intermediate contact jaws of two of the charging sets; a resistance connected to the side contact jaws of the two said charging sets, the contact blades of the two said charging sets being shaped to connect the resistance into the charging circuit in two positions of the shaft, the two middle contact jaws of the other two charging sets being connected together and the side jaws of the other charging sets being connected respectively to the four side jaws of the battery sets, the contact blades of the four charging sets being arranged to coöperate with their respective contact jaws, so that in one position of the shaft one battery is connected into the charging circuit and in another position of the shaft the other battery is connected into the charging circuit and the resistance is connected into the charging circuit before either battery is disconnected from the charging circuit.

10. In an electric circuit-controlling device, in combination with two storage batteries and a discharging circuit, an operating shaft, two contact blades thereon, each contact blade extending radially from two sides of the shaft, two sets of three contact jaws disposed about the shaft in the paths of movement of the contact blades, one set for each blade, the poles of one battery being connected to the two side jaws of the sets on one side of the device, the poles of the other battery being connected to the two side jaws of the sets on the other side of the device, and the discharging circuit being connected to the two middle jaws, each of the two blades being shaped so that the radial extension on one side of the shaft is in permanent connection with its middle contact jaw, and the radial extension on the other side of the shaft is adapted to make contact with one side jaw in one position of the shaft and to make contact with the other side jaw in another position of the shaft and to make contact with both side jaws in an intermediate position of the shaft.

KATHARINE COLEMAN,
     *Administratrix.*

Witnesses:
 Victor D. Borst,
 Bernard Cowen.